United States Patent [19]
Mital

[11] Patent Number: 5,594,905
[45] Date of Patent: Jan. 14, 1997

[54] EXCEPTION HANDLER AND METHOD FOR HANDLING INTERRUPTS

[75] Inventor: Amit Mital, Redmond, Wash.

[73] Assignee: Microsoft Corporation, Redmond, Wash.

[21] Appl. No.: 421,375

[22] Filed: Apr. 12, 1995

[51] Int. Cl.$^6$ .............................. G06F 9/46; G06F 13/14
[52] U.S. Cl. ......................... 395/733; 395/737; 395/739; 395/740
[58] Field of Search ...................................... 395/733, 737, 395/739, 740, 866, 867, 868

[56] References Cited

U.S. PATENT DOCUMENTS

| | | | |
|---|---|---|---|
| 4,734,882 | 3/1988 | Romagosa | 395/737 |
| 5,003,286 | 3/1991 | Carbonaro et al. | 340/146.2 |
| 5,291,603 | 3/1994 | Morse et al. | 395/742 |
| 5,317,747 | 5/1994 | Mochida et al. | 395/733 |
| 5,511,200 | 4/1996 | Jayakumar | 395/739 |
| 5,530,872 | 6/1996 | Smeltzer et al. | 395/733 |
| 5,530,875 | 6/1996 | Wach | 395/737 |
| 5,530,891 | 6/1996 | Gephardt | 395/800 |

*Primary Examiner*—Jack B. Harvey
*Assistant Examiner*—Raymond N. Phan
*Attorney, Agent, or Firm*—Lee & Hayes, PLLC

[57] ABSTRACT

An exception handler has a priority table which stores information pertaining to priorities for handling one or more concurrently generated interrupts. This table holds all possible priorities of interrupts given the numerous permutations that can arise for any set of active and non-active interrupts. The exception handler also includes a cause register that has flag bits to indicate when an interrupt has been generated. The bits in the cause register define an indexing address to a location in the priority table that contains the priority information for a given combination of active and non-active interrupts. In one implementation, the priority table stores the addresses of interrupt service routines (ISRs) for handling the highest priority active interrupt from among all currently active interrupts. In another implementation, the priority table holds index addresses to a second, ISR address table which associates the interrupts with the addresses of the corresponding ISRs that service them. The priority table effectively selects the highest priority interrupt by addressing the appropriate location in the ISR address table to extract the address of the suitable ISR. The tradeoff of these two implementations is between performance and memory size, with the single table implementation having higher performance but requiring more memory space and the double table implementation consuming less memory space but having lower performance. The exception handler of this invention is capable of dynamically adapting to various hardware requirements in terms of interrupts and priorities, as well as handling the interrupts in a real-time manner through the efficiencies gained with the priority table.

29 Claims, 6 Drawing Sheets

PRIORITY TABLE

| 00 | NO OPERATION |
|----|--------------|
| 01 | ADDRESS OF ISR FOR INT. 0 |
| 02 | ADDRESS OF ISR FOR INT. 1 |
| ⋮ | ⋮ |
| 9B | ADDRESS OF ISR FOR INT. 7 |
| 9C | ADDRESS OF ISR FOR INT. 2 |
| 9D | ADDRESS OF ISR FOR INT. 2 |
| ⋮ | ⋮ |
| FE | ADDRESS OF ISR FOR INT. 5 |
| FF | ADDRESS OF ISR FOR INT. 5 |

CAUSE REGISTER

EXCEPTION HANDLER AND METHOD FOR HANDLING INTERRUPTS

TECHNICAL FIELD

This invention relates to exception handlers and methods for handling interrupts. More particularly, this invention relates to exception handlers and methods for handling various sets of prioritized interrupts that might be generated by different types of hardware platforms whereby the priority and types of interrupts within each set can be dynamically configured in the exception handlers.

BACKGROUND OF THE INVENTION

In the design of operating systems, designers often attempt to develop operating software that can run on many diverse hardware platforms. This helps free the operating system from unnecessary hardware constraints that would otherwise render the operating system software unportable from one hardware device to another. To accomplish this goal, designers typically define a hardware abstraction layer (HAL) which describes the interface between low level system software components and hardware dependent software that runs on the underlying hardware. This layer is designed to enable interaction between essentially the same operating system and many diverse types of underlying hardware.

Interrupt handling is one feature that is usually defined in the hardware abstraction layer. An "interrupt" is a request-for-attention signal that can be passed by either hardware or software to a computer's CPU (Central Processing Unit). Interrupts can occur for many reasons, ranging from normal to highly abnormal situations, including service requests from hardware, errors in processing, program attempts to do the impossible, and memory problems. A "hardware interrupt" is a request for service generated by hardware components, such as a keyboard, mouse, disk drive, I/O port, and microprocessor.

The interrupt causes the CPU to suspend its current operations, save the status of its work, and transfer control to a special routine known as an "exception handler". The exception handler typically resides in the CPU at a known address. When an interrupt occurs, the CPU begins executing code at that location. The exception handler determines the cause of the interrupt and then services it by calling an appropriate set of instructions to be carried out.

The exception handler initiates different instructions for different types of interrupts. More specifically, each type of interrupt has an associated dedicated routine, known as an "interrupt service routine" or ISR. When a CPU receives interrupt requests from more than one source, the exception handler invokes a hierarchy of permission levels, called "interrupt priorities", to determine which of the interrupts is handled first.

To handle multiple concurrent interrupts, conventional exception handlers require several instructions to first determine the cause of the interrupt, then check priority, and then find the appropriate ISR to service the interrupt. This results in slower handling and lower performance. Although this speed and performance is acceptable in many desk-top applications, it will not support real-time operating systems which must execute interrupts at very high speed and efficiency.

The performance factor is further complicated by the desire to handle prioritized sets of interrupts from many diverse hardware platforms. Different hardware platforms often have different interrupts and dissimilar interrupt priorities. To be acceptable, an exception handler should provide: (1) real-time response for hardware interrupts, (2) dynamic setting of interrupt priorities, and (3) dynamic registering of exception handlers.

It is an object of this invention to provide an exception handler that can be dynamically configured to handle diverse sets of differently prioritized interrupts on a real-time basis.

It is noted that in some operating environments, there can be a slight distinction between an "exception" and an "interrupt". However, the distinction is not important for purposes of this disclosure, and the terms will be used interchangeably throughout. Both "exceptions" and "interrupts" refer to requests or conditions that cause the CPU to temporarily stop its present task and locate instructions in a separate routine for handling them.

SUMMARY OF THE INVENTION

This invention provides an exception handler capable of sorting through multiple concurrently generated interrupts to quickly handle the highest priority interrupt in a real-time manner. The exception handler rapidly identifies the highest priority interrupt from among the one or more active interrupts and then efficiently locates the interrupt service routine (ISR) for that highest priority interrupt.

According to one aspect of this invention, the exception handler includes a cause register to hold bits that indicate when an interrupt has been generated. When an interrupt is generated, a corresponding bit in the cause register is set to a binary value (such as a "1"), whereas bits corresponding to non-active interrupts remain at the other binary value (such as a "0"). The exception handler further includes a priority table to store information pertaining to priorities for handling one or more concurrently generated interrupts. This table holds all possible priorities of interrupts given the numerous permutations that can arise for any set of active and non-active interrupts. The cause register and priority table are correlated in a manner that enables the bits in the cause register to define an indexing address to a location in the priority table that contains the priority information for a given combination of active and non-active interrupts.

In one embodiment, the priority table stores the addresses of the ISR for handling the highest priority active interrupt from among all currently active interrupts. In another embodiment, the priority table holds index addresses to a second table, referred to in this disclosure as the "ISR address table," which associates the interrupts with addresses of corresponding ISRs that service them. The priority table effectively selects the highest priority interrupt by addressing the appropriate location in the ISR address table to extract the address of the suitable ISR. The tradeoff between these two embodiments is performance and memory size, with the single table embodiment having higher performance but requiring more memory space and the double table embodiment consuming less memory space but having lower performance.

According to other aspects of this invention, a method for handling interrupts as well as a method for constructing an exception handler are described.

According to yet another aspect of this invention, a method for dynamically changing priorities in which interrupts are handled by an exception handler is discussed. This method includes providing a first prioritized list of interrupts and forming a priority table containing information pertaining to the first priority for handling the interrupts given various combinations of concurrently generated interrupts. The bits of the cause register are correlated to an address in the priority table so that when one or more interrupts are generated, the cause register holds an address to a location in the priority table which contains a priority of handling the one or more interrupts. Interrupts are then handled according to the first priority information contained in the priority table. Subsequently, a second prioritized list of interrupts is provided. A new prioritized list might arise, for example, when a new hardware is introduced to the operating system. To dynamically accommodate the priority change, the priority table is simply reformulated to contain information pertaining to the second priority for handling the interrupts given various combinations of concurrently generated interrupts. Thereafter, the interrupts are handled according to the second priority information contained in the priority table.

BRIEF DESCRIPTION OF THE DRAWINGS

The same reference numbers are used throughout this disclosure to reference like components and features.

DETAILED DESCRIPTION OF THE PREFERRED EMBODIMENT

Figures 1, 2:
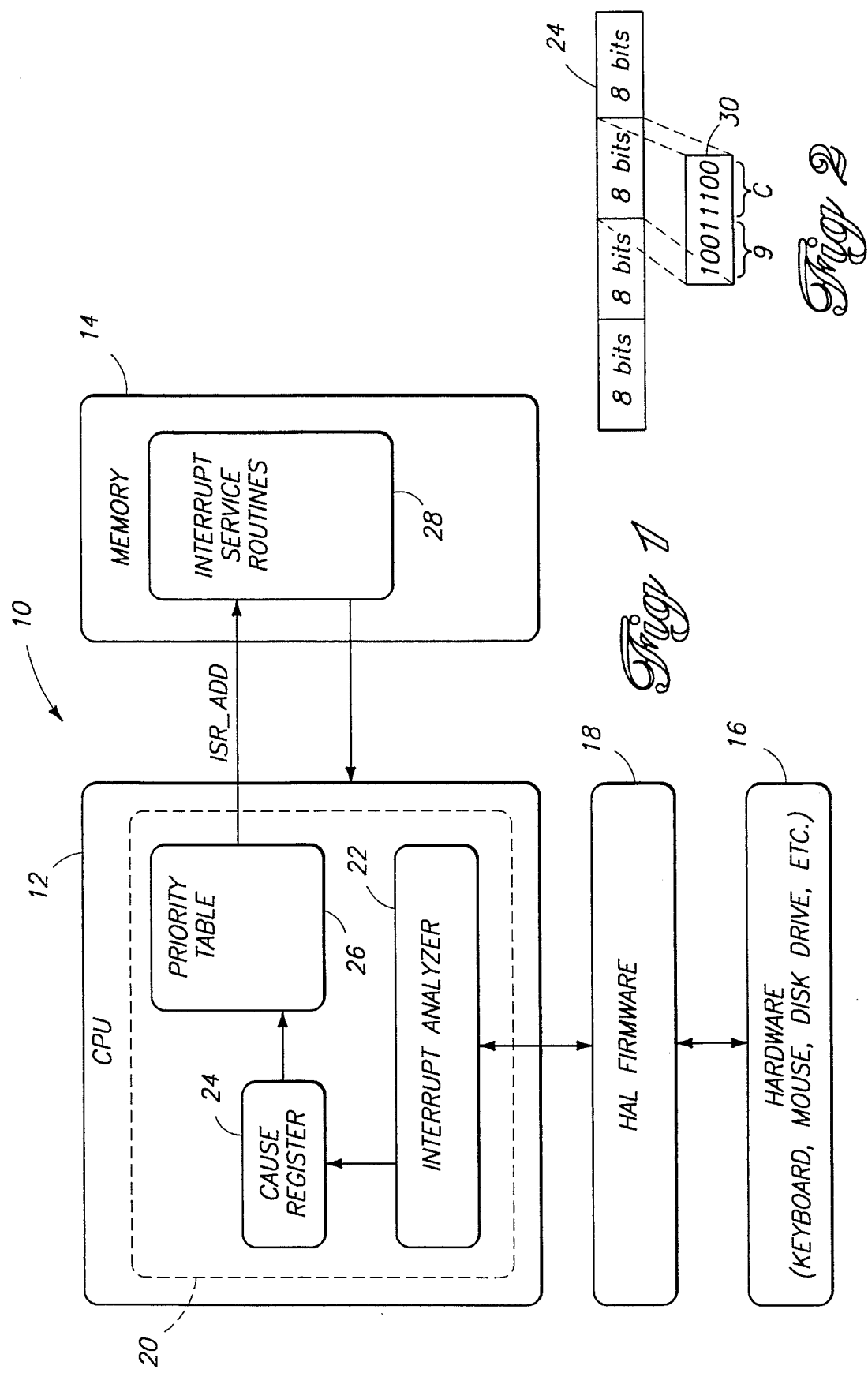
FIG. 1 is a block diagram of a computer system having an exception handler for handling interrupts according to one aspect of this invention.
FIG. 2 is a diagrammatic illustration of an interrupt cause register used in the exception handler of FIG. 1.

FIG. 1 shows a computer system 10 having a central processing unit (CPU) 12, memory 14 (such as ROM-based and/or RAM-based memory), and hardware 16 (such as a keyboard, mouse, disk drive, or other device). Hardware 16 communicates with the CPU by generating one or more interrupts which request attention from the CPU. Hardware interrupts can occur at random, as when characters are received from the keyboard or mouse, or in a predictable manner, as with interrupts from a clock or timer.

The computer system 10 further includes firmware 18 formed at a hardware abstraction layer (HAL) intermediate of CPU 12 and hardware 16. HAL firmware 18 provides an interface between low level system software of the CPU and hardware dependent software that runs on the hardware. It is common for the firmware and hardware components of the computer system to be made by one manufacturer and the operating software to be developed by another manufacturer.

The HAL firmware 18 enables essentially the same CPU operating system to run on many diverse types of underlying hardware. Here, when hardware 16 generates an interrupt, it is channeled through HAL firmware 18 which packages the hardware interrupt in a format that can be recognized by CPU 12.

An exception handler 20 is resident in CPU 12 to service the generated interrupts. More particularly, when an interrupt is received, the CPU suspends its current operations, saves the status of its work, and transfers control to exception handler 20. For purposes of continuing discussion, aspects of this invention will be described in the context of a microprocessor CPU known as the MIPS R3000, or derivatives thereof. It is noted, however, that this invention is not limited to this CPU, but can be implemented in other CPUs.

Exception handler 20 resides in CPU 12 at a known address. When an interrupt occurs, the CPU begins executing code at that location. The exception handler includes an interrupt analyzer 22 which determines the cause of the interrupt. Once the cause is ascertained, information pertaining to the cause of the interrupt is placed in a cause register 24.

FIG. 2 shows an example 32-bit cause register 24. Part of the contents of the cause register are a set of bits which indicate which interrupts have been generated and which have not. Suppose, for example, that hardware 16 generates eight interrupts. In the FIG. 2 implementation, one 8-bit byte of the cause register (referenced by numeral 30) is dedicated to flagging interrupt activity. Each bit corresponds in a one-to-one relationship with an associated interrupt. When one of the eight interrupts is generated, the associated bit in the cause register is set to a first binary value (such as a "1"), whereas the other bits associated with non-active interrupts remain at a second binary value (such as a "0"). As used in this document, an "active" interrupt is one that has been generated and a "non-active" interrupt is one that has not been generated. In FIG. 2, inter been concurrently generated as indicated by the "1"s at associated bit places 2, 3, 4, and 7.

With reference again to FIG. 1, exception handler 20 has a priority table 26 which stores information pertaining to different priorities for handling interrupts in the event that various groupings of one or more interrupts are concurrently generated. Priority table 26 preferably holds all possible interrupt handling priorities given the numerous permutations that can arise for any set of active and non-active interrupts. In our example of eight interrupts, there are a possible 256 (i.e., $2^8=256$) different combinations of interrupts that might occur simultaneously. For discussion purposes, suppose that the eight interrupts of hardware 16 have the prioritized order that is listed in Table 1.

TABLE 1

| Example Priorities of Interrupts |
| --- |
| Interrupt 5 -- Highest Priority |
| Interrupt 2 |
| Interrupt 7 |
| Interrupt 4 |
| Interrupt 3 |
| Interrupt 6 |
| Interrupt 1 |
| Interrupt 0 -- Lowest Priority |

According to an aspect of this invention, the set of interrupt-representing bits 30 in cause register 24 are used to form an indexing address to priority table 26. For instance, the eight bits illustrated in FIG. 2 define the hexadecimal address "9C." The indexed location in priority table 26 contains the priority information for the particular combination of concurrently generated interrupts. That is, the priority table indicates which of the multiple, presently active interrupts should be handled first. In the implementation illustrated in FIG. 1, the priority table stores the addresses of the interrupt service routines (ISRs) for the highest priority interrupt for any given combination of active and non-active interrupts.

Figure 3:
FIG. 3 is a diagrammatic illustration showing the interrupt cause register addressing a location in a priority table to locate an address of an interrupt service routine.

This is shown more particularly in FIG. 3 where each entry in the priority table contains an ISR address. When one or more interrupts are generated, the associated bits in cause register 24 define an 8-bit address to the priority table. Cause register 24 indexes to a specific location in the priority table based upon this address. Here, in our continuing example, the cause register points to the address of 9C. This location in the table contains the ISR address for the highest priority interrupt amongst the active interrupts that would create an address of 9C in the cause register. From FIG. 2, the address of 9C is formed when bits 2, 3, 4, and 7 are set to "1" and bits 0, 1, 5, and 6 remain at "0". This pattern indicates that interrupts 2, 3, 4, and 7 are active and interrupts 0, 1, 5, and 6 are non-active. From Table 1 above, the highest priority interrupt among the active interrupts is interrupt 2. Accordingly, the address for the ISR that services interrupt 2 is kept in the priority table 26 at the entry address of 9C.

In another situation, for example, all interrupts might be simultaneously generated. This would lead to a setting of all eight bits in the cause register, producing a priority table look up address of "FF." When all interrupts are generated, Table 1 suggests that interrupt 5 is given highest priority. Accordingly, the location in priority table 26 that is at an address FF contains the address of the ISR for interrupt 5.

It is noted that in the case where only one interrupt is generated, the priority status obviously dictates handling the only active interrupt. This is true even for the comparatively lowest priority interrupt 0 (from Table 1). In FIG. 3, it is shown that the when only lowest priority interrupt 0 is active (causing a priority address of "01" in the cause register), the address of the ISR for the interrupt 0 is referenced in the priority table.

With reference again to FIG. 1, priority table 26 passes the ISR address (ISR_ADD) to memory 14 which stores the various interrupt service routines 28. The appropriate ISR is called using the address from the priority table and employed by the exception handler to service the highest priority interrupt.

The exception handler of this invention therefore quickly ascertains the cause of an interrupt generated by the hardware and rapidly locates the ISR for the highest priority interrupt. Through the use of the priority table, the exception handler is able to simultaneously deduce the interrupt priority as well as provide the address of the ISR for handling that highest priority interrupt. This efficient, streamlined construction enables the exception handler to service hardware interrupts on a real-time basis, even when the interrupts are passed through the intermediate HAL firmware 18.

Figure 4:
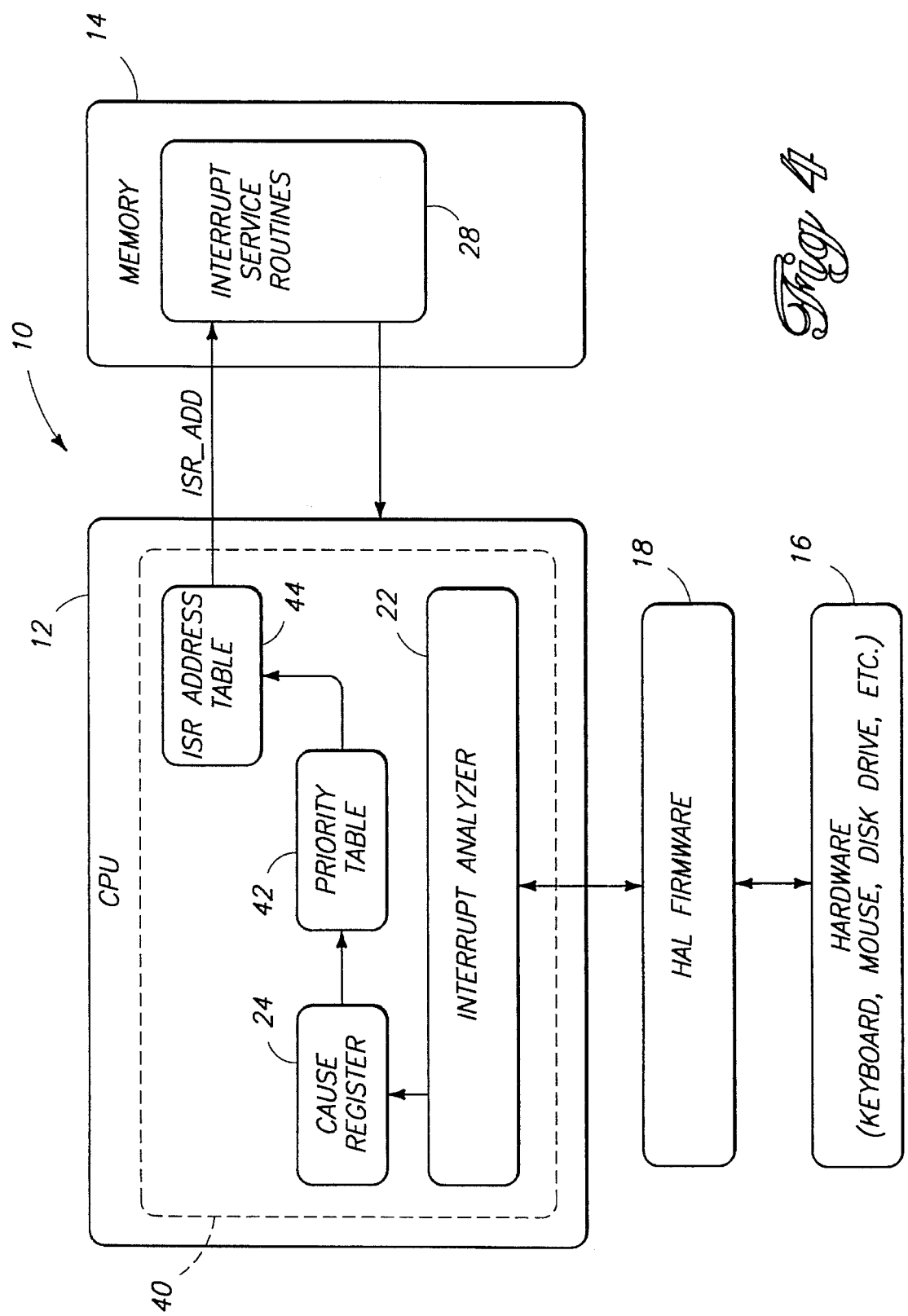
FIG. 4 is a block diagram of a computer system having an exception handler for handling interrupts according to another aspect of this invention.

FIG. 4 shows a computer system 10 having a modified exception handler 40 according to another embodiment of this invention. Exception handler 40 is different from the one described above in FIG. 1 in that it includes two tables: a priority table 42 and an ISR address table 44. In this implementation, ISR address table 44 holds the addresses of the ISRs employed to service the interrupts. Priority table 42 contains priority information in the form of identities of the highest priority interrupts for each given mix of concurrently generated interrupts. Preferably, the priority table stores an index address to a location in the ISR address table 44 that contains the address of the ISR for the highest priority interrupt.

Figure 5:
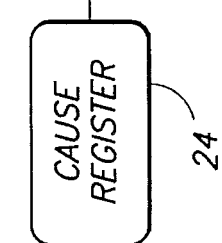
FIG. 5 is a diagrammatic illustration showing the cause register addressing a location in the priority table. The information gained from the priority table is then used to address a location in an ISR address table.

FIG. 5 shows the interaction of the two tables in more detail. In keeping with our above example, cause register 24 indexes the priority table 42 at the address 9C. This location stores information that, for this given set of active interrupts, interrupt 2 is to receive highest priority. The priority information is preferably in the form of an index address, such as a 3-bit address of "010", which points to a location at entry 2 in ISR address table 44. At entry 2, the ISR address table stores the address of the ISR for servicing interrupt 2.

With reference to FIG. 4, the ISR address (ISR_ADD) is passed from ISR address table 44 to memory 14 to call the appropriate interrupt service routine 28.

The two implementations described above have a tradeoff between performance and size of required memory to support the one or two tables. In the single table embodiment of FIG. 1, the exception handler experiences better performance because less instructions are used to find the ISR address for the highest priority interrupt. That is, a single table look up is all that is used to rapidly locate the appropriate ISR address. However, the size of priority table 26 is $2^N \times M$ bytes where N represents the total number of interrupts and M represents the number of bytes in the address of the ISRs that service the interrupts. In our example, there are eight interrupts (i.e., N=8) and each ISR address has four bytes (i.e., M=4). Accordingly, the memory size consumed by priority table 26 is approximately 1 Kbyte (i.e., $2^8 \times 4 = 1024$ bytes).

In comparison, the double table embodiment of FIG. 4 consumes less overall memory space. The size of memory used to support priority table 42 and ISR address table 44 is $2^N + (N \times M)$ bytes, where again N represents the number of interrupts and M represents the number of bytes in the ISR address. More particularly, the priority table has a size of $2^N$ bytes and the ISR address table has a size of N×M bytes. The total memory consumed by the double table arrangement is only 288 bytes (i.e., $2^8 + (8 \times 4) = 288$ bytes), nearly one-fourth less than the space consumed by the single table exception handler. However, the dual table exception handler uses more instructions to perform a double table look up. Moreover, additional memory accesses are needed. This results in lower performance in comparison to the single table exception handler.

It is noted that the exception handlers described herein are preferably formed as part of the operating system of the CPU. In this manner, the aspects described herein can be carried out by a processor programmed to (1) detect one or more active interrupts generated by the hardware; (2) set one or more bits in the cause register; (3) look up, in the priority table at a location referenced by the cause register bits, information pertaining to the priority of handling the active interrupts; and (4) handle the active interrupt that is considered highest priority by the priority table.

Figure 6:
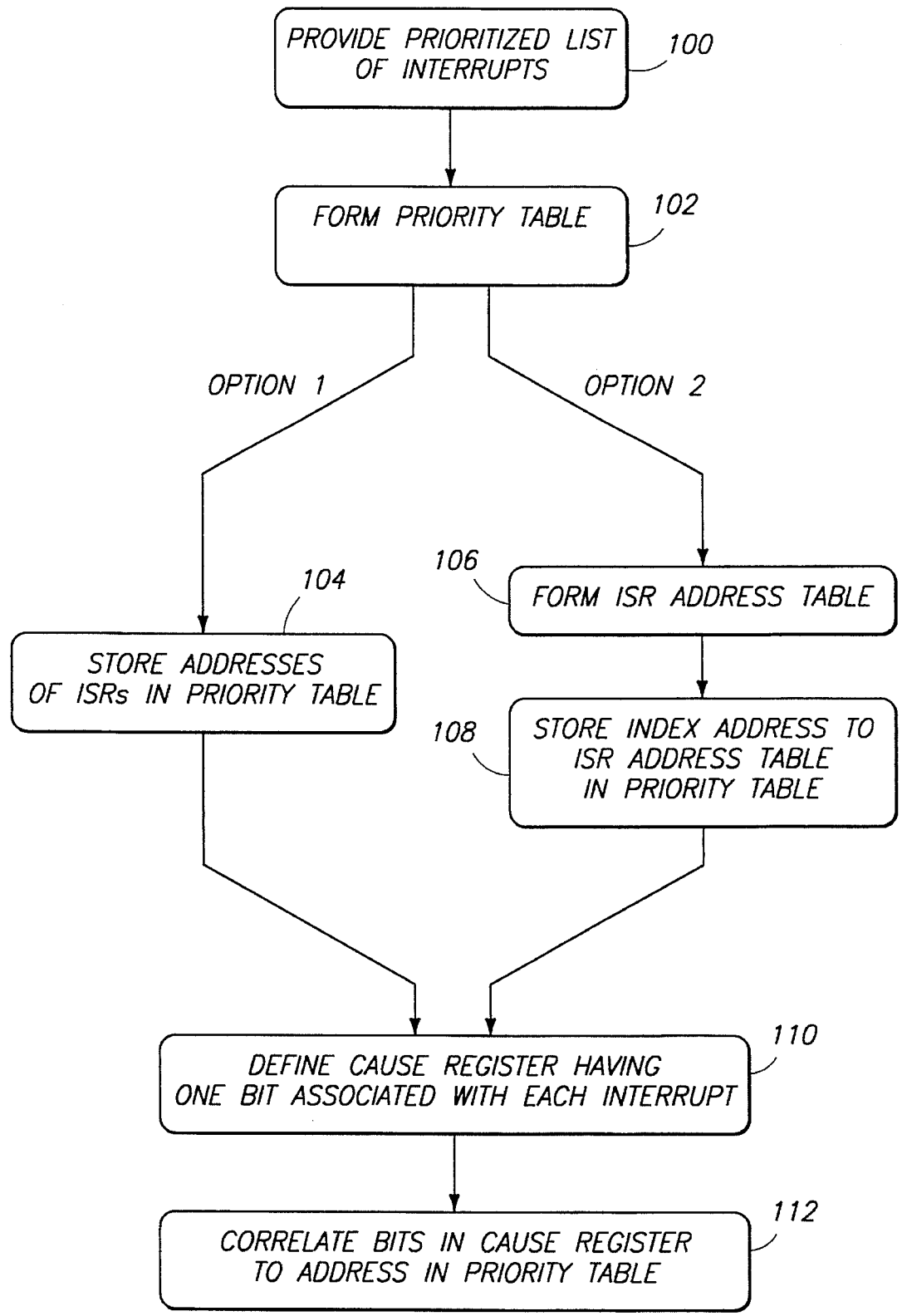
FIG. 6 is a flow diagram of a method for constructing an exception handler according to another aspect of this invention.

FIG. 6 shows preferred steps in a method for constructing an exception handler according to this invention. At step 100, a list of prioritized interrupts is provided to the CPU. This occurs during registration when a new hardware is first coupled to the CPU operating system. The hardware registers the identity of all interrupts with its associated driver (a dedicated software or firmware component that interfaces with the hardware). The CPU uses this information to construct the priority table (step 102). That is, a priority interrupt in every possible permutation of one or more active interrupts is determined. Information pertaining to that highest priority interrupt is then stored in the priority table.

At step 104, under the single table option 1, the actual addresses of the ISRs are stored in the priority table. Under the dual table option 2, the ISR address table is formed at step 106 to provide an associated list of interrupts and the addresses of their respective ISRs. The ISR address table is then cross-indexed from the priority table by storing the indexing addresses of the ISR address table in the priority table (step 108) as opposed to the actual ISR addresses themselves. In this manner, the priority table holds addresses to the ISR address table which in turn contains the actual addresses of the ISRs.

At step 110, the CPU defines a cause register that has a portion dedicated to flagging interrupt activity whereby the bits represent associated interrupts. The cause register is correlated to the priority table in manner that the interrupt-representing bits form an address to the priority table (step 112).

Figure 7:
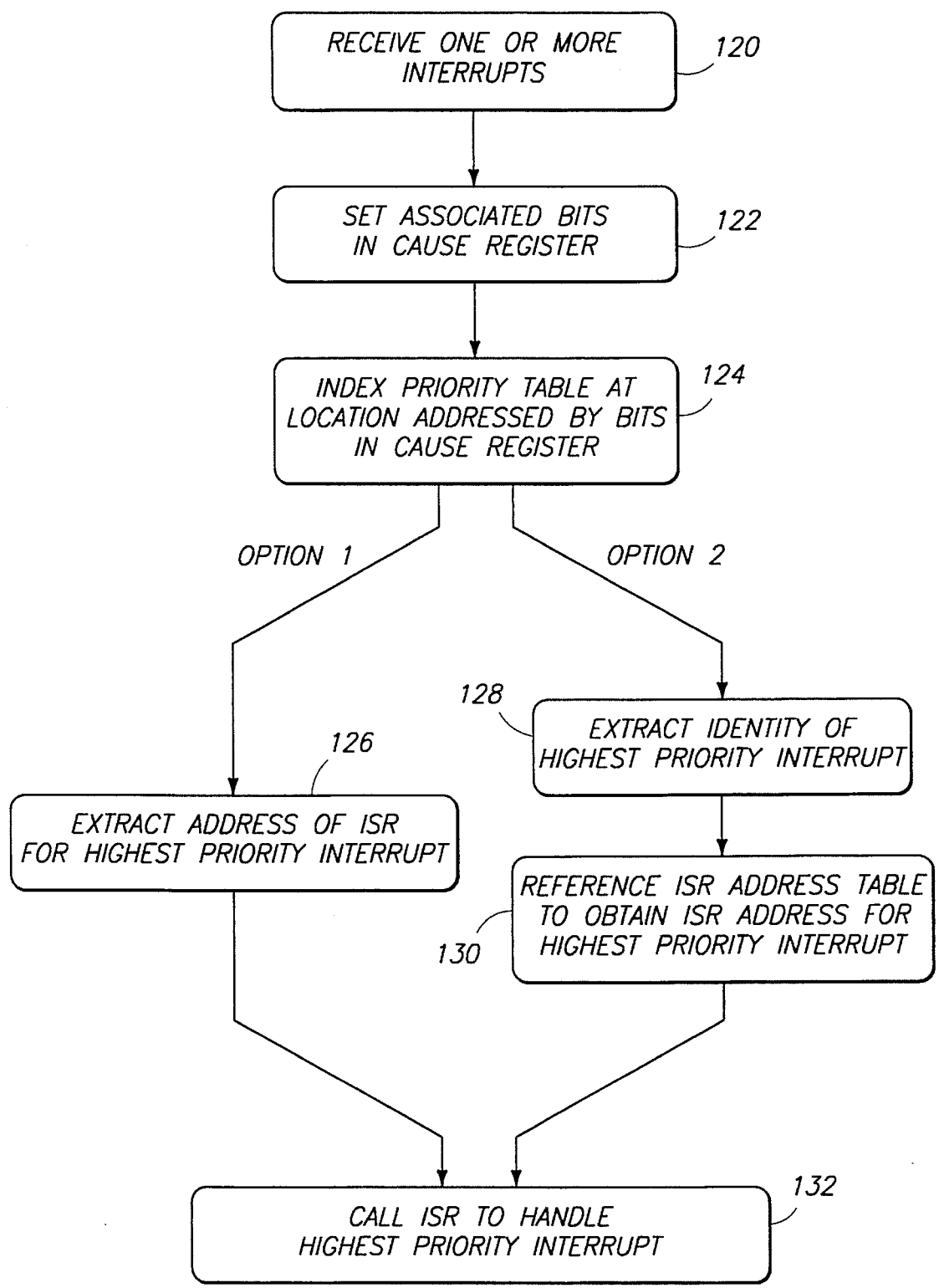
FIG. 7 is a flow diagram of a method for handling interrupts on a prioritized basis according to yet another aspect of this invention.

FIG. 7 shows preferred steps in a method for handling interrupts generated in hardware according to this invention. At step 120, the exception handler receives one or more concurrently generated interrupts. At step 122, the one or more bits of the cause register that are associated with the generated interrupts are set. This portion of the cause register forms an address to a specific location in the priority table which holds information pertaining to a priority for handling the one or more interrupts. At step 124, the priority table is indexed at the address held by the cause register.

At step 126, under the single table option 1, the actual address of the ISR for the highest priority interrupt is extracted from the priority table. Alternatively, under the dual table option 2, the identity of the highest priority interrupt is ascertained from the priority table (step 128) and used to cross-reference into the ISR address table to obtain the actual ISR address (step 130). At step 132, the exception handler calls the appropriate ISR using the address extracted from the priority table or ISR address table to handle the highest priority interrupt.

One advantage of this invention is that the exception handler in the CPU can be dynamically configured to handle various different types of interrupts as well as different priorities. This permits the operating system to quickly adapt to many different underlying hardware platforms. For instance, suppose the CPU is coupled with a first hardware type that has a first prioritized list of interrupts. The CPU dynamically forms the priority table (and ISR address table if desired) when the hardware registers its interrupts and corresponding priorities. The CPU then handles the interrupts according to this preset priority using the priority table in the manner described above.

Now suppose that the same CPU is coupled to a second hardware type that has a second, differently prioritized list of interrupts. The CPU simply dynamically reformulates its priority table when the new hardware registers the new interrupts and their priorities. From that point on, the CPU handles the interrupts according to the second preset priority in the priority table.

The exception handler and methods of this invention are capable of handling various groups of concurrently generated interrupts according to their priority in a real-time manner. Moreover, the exception handler and methods of this invention are able to dynamically adapt to different types and priorities of interrupts.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An exception handler for handling interrupts, the exception handler comprising:

a cause register to hold bits indicative of interrupt activity, individual cause register bits having a first binary value when an interrupt is active and a second binary value when an interrupt is non-active;

a priority table to store information pertaining to priorities for handling one or more active interrupts; and the cause register and priority table being correlated in a manner that the bits in the cause register form an indexing address to a location in the priority table that contains the priority information for one or more active interrupts.

2. An exception handler as recited in claim 1 wherein the priority table stores addresses to interrupt service routines.

3. An exception handler as recited in claim 1 wherein the priority table stores an individual address to an interrupt service routine for each possible combination of active and non-active interrupts, whereby the interrupt service routine that is referenced by the address stored in the priority table at the location addressed by the bits in the cause register is associated with an active interrupt of highest priority from among other active interrupts.

4. An exception handler as recited in claim 1 and further comprising:

an interrupt service routine (ISR) address table that holds addresses for interrupt service routines associated with the interrupts; and the priority table storing an index address to a location in the ISR address table that contains the address to the interrupt service routine for an interrupt of highest priority.

5. A computer comprising an exception handler as recited in claim 1.

6. An exception handler as recited in claim 3 wherein the priority table has the following size:

$$2^N \times M \text{ bytes}$$

where N represents a total number of interrupts and M represents a number of bytes in the address of the interrupt service routine.

7. An exception handler as recited in claim 4 wherein the priority table has a size of $2^N$ bytes where N represents a total number of interrupts and the ISR address table has a size of N×M bytes where M represents a number of bytes in the address of the interrupt service routine.

8. For use in handling different sets of interrupts according to different priorities imposed by architectures of diverse hardware, a processor is programmed to perform the following steps (1) detecting one or more active interrupts generated by the hardware, (2) setting one or more bits in a cause register in a manner that corresponds to the generated active interrupts whereby a bit of a first binary value represents an active interrupt and a bit of a second binary value represents a non-active interrupt, (3) looking up, in a priority table at a location referenced by the bits in the cause register, information pertaining to priority of handling the one or more active interrupts, and (4) handling the active interrupt that is considered highest priority by the priority table.

9. A processor according to claim 8 and further comprising the following step of looking up in the priority table the identity of the highest priority active interrupt.

10. A processor according to claim 8 and further comprising the following step of looking up in the priority table an address of an interrupt service routine for servicing the highest priority active interrupt.

11. A processor according to claim 8 and further comprising the following step of looking up in the priority table an identity of the highest priority active interrupt and to index, using the identity of the highest priority active interrupt, an ISR address table to find an address of an interrupt service routine for servicing the highest priority active interrupt.

12. A computer comprising a processor as recited in claim 8.

13. A method for handling interrupts comprising the following steps:
   receiving one or more interrupts;
   setting one or more bits in a cause register which correspond to the received interrupts, the bits representing an address;
   indexing a priority table to a location at the address represented by the bits in the cause register; and
   extracting from the indexed location of the priority table information pertaining to a priority for handling the one or more interrupts.

14. A method as recited in claim 13 and further comprising the step of handling an interrupt from among the one or more received interrupts that is considered highest priority according to the priority information extracted form the priority table.

15. A method as recited in claim 13 and further comprising the following additional steps:
   providing a priority table which stores addresses of various interrupt service routines for corresponding interrupts; and
   extracting from the indexed location of the priority table an address of an interrupt service routine that corresponds to an interrupt with highest priority.

16. A method as recited in claim 13 and further comprising the following additional steps:
   providing a priority table which identifies the interrupt with highest priority from among the one or more received interrupts;
   providing an interrupt service routine (ISR) address table which stores addresses of various interrupt service routines for corresponding interrupts;
   extracting from the indexed location of the priority table the identity of the highest priority interrupt; and
   referencing the ISR address table to derive an address of the interrupt service routine that corresponds to the highest priority interrupt extracted from the priority table.

17. A computer programmed to perform the steps in the method recited in claim 13.

18. A computer-readable memory which directs a computer to perform the steps in the method as recited in claim 13.

19. A method as recited in claim 15 and further comprising the additional step of calling the interrupt service routine to handle the highest priority interrupt using the address extracted from the priority table.

20. A method for constructing an exception handler comprising the following steps:
   providing a cause register having bits which are set when corresponding interrupts are generated;
   forming a priority table containing information pertaining to a priority for handling the interrupts given various combinations of concurrently generated interrupts; and
   correlating the bits of the cause register to an address in the priority table so that when one or more interrupts are generated, the cause register holds an address to a location in the priority table which contains information pertaining to a priority of handling the one or more interrupts.

21. A method as recited in claim 20 wherein the forming step comprises forming a priority table which contains addresses of various interrupt service routines for corresponding interrupts so that when one or more interrupts are generated, the cause register holds an address to a location in the priority table that contains an address to an interrupt service routine for an interrupt of highest priority.

22. A method as recited in claim 20 and further comprising the following steps:
   forming a priority table which identifies a priority interrupt having priority from among the one or more interrupts;
   forming an interrupt service routine (ISR) address table which stores addresses of various interrupt service routines for corresponding interrupts; and
   cross-indexing the ISR address table from the priority table so that when one or more interrupts are generated, the cause register holds an address to a location in the priority table that in turn holds an address to a location in the ISR address table that contains an address to the interrupt service routine for the interrupt of highest priority.

23. A computer programmed to perform the steps in the method recited in claim 20.

24. A computer-readable memory which directs a computer to perform the steps in the method as recited in claim 20.

25. A method for dynamically changing priorities in which interrupts are handled by an exception handler, the exception handler having a cause register having bits which are set when corresponding interrupts are generated, the method comprising the following steps:
   forming a priority table containing first priority information pertaining to a first priority for handling the interrupts given various combinations of concurrently generated interrupts;
   correlating the bits of the cause register to an address in the priority table so that when one or more interrupts are generated, the cause register holds an address to a location in the priority table which contains information pertaining to a priority of handling the one or more interrupts;
   handling interrupts according to the first priority information contained in the priority table;
   subsequently reformulating the priority table to contain second priority information pertaining to a second priority for handling the interrupts given various combinations of concurrently generated interrupts; and
   handling interrupts according to the second priority information contained in the priority table.

26. A method as recited in claim 25 wherein the forming step comprises forming a priority table which contains addresses of various interrupt service routines for corresponding interrupts so that when one or more interrupts are generated, the cause register holds an address to a location in the priority table that contains an address to an interrupt service routine for an interrupt of highest priority.

27. A method as recited in claim 25 and further comprising the following steps:

forming a priority table which identifies a priority interrupt having priority from among the one or more interrupts;

forming an interrupt service routine (ISR) address table which stores addresses of various interrupt service routines for corresponding interrupts; and cross-indexing the ISR address table from the priority table so that when one or more interrupts are generated, the cause register holds an address to a location in the priority table that in turn holds an address to a location in the ISR address table that contains an address to the interrupt service routine for the interrupt of highest priority.

28. A computer programmed to perform the steps in the method recited in claim 25.

29. A computer-readable memory which directs a computer to perform the steps in the method as recited in claim 25.

* * * * *